United States Patent [19]

Ford et al.

[11] Patent Number: 4,931,186

[45] Date of Patent: Jun. 5, 1990

[54] CONCENTRATION OF SOLIDS IN A SUSPENSION

[75] Inventors: Douglas L. Ford; Eric W. Anderson; Clinton V. Kopp, all of New South Wales, Australia

[73] Assignee: Memtec Limited, Parramatta, Australia

[21] Appl. No.: 939,121

[22] PCT Filed: Mar. 3, 1986

[86] PCT No.: PCT/AU86/00049

§ 371 Date: Oct. 27, 1986

§ 102(e) Date: Oct. 27, 1986

[87] PCT Pub. No.: WO86/05116

PCT Pub. Date: Sep. 12, 1986

[30] Foreign Application Priority Data

Mar. 5, 1985 [AU] Australia .............................. PG9572
Mar. 13, 1985 [AU] Australia .............................. PG9692
Nov. 11, 1985 [AU] Australia .............................. PG3355

[51] Int. Cl.$^5$ .............................................. B01D 13/00
[52] U.S. Cl. ...................................... 210/636; 210/798
[58] Field of Search ................. 210/636, 798; 134/21, 134/22.11

[56] References Cited

U.S. PATENT DOCUMENTS

| | | | |
|---|---|---|---|
| 3,838,776 | 10/1974 | Brun ..................................... | 210/321 |
| 3,912,624 | 10/1975 | Jennings . | |
| 3,992,301 | 11/1976 | Shippey et al. . | |
| 4,125,462 | 11/1978 | Latty ................................... | 210/238 |
| 4,214,020 | 7/1980 | Ward et al. .......................... | 427/296 |
| 4,220,535 | 9/1980 | Leonard ............................ | 210/321 R |
| 4,414,113 | 11/1983 | Laterra ................................ | 210/636 |
| 4,545,940 | 10/1985 | Mutoh ................................ | 260/428 |
| 4,767,539 | 8/1988 | Ford .................................... | 210/636 |

FOREIGN PATENT DOCUMENTS

| | | |
|---|---|---|
| 3440084 | 4/1985 | Australia . |
| 56-24006 | 3/1981 | Japan . |
| 60-22906 | 2/1985 | Japan . |
| 60-32897 | 2/1985 | Japan . |
| 60-44088 | 3/1985 | Japan . |
| 60-137404 | 7/1985 | Japan . |
| 1535832 | 12/1978 | United Kingdom . |
| 2120952 | 12/1983 | United Kingdom . |

OTHER PUBLICATIONS

"Membrane Filtration" by Brock, 1983, published by Science Tech., Inc.

Primary Examiner—Frank Spear
Attorney, Agent, or Firm—Oblon, Spivak, McClelland, Maier & Neustadt

[57] ABSTRACT

A method of concentrating solids in a liquid suspension using a filter having a plurality of hollow, microporous, elastic fibres with a shell or housing, comprising applying the suspension to an outer surface of the fibres whereby a portion of the suspension passes through the fibre walls and at least a portion of the solids is retained on or in the fibres; and discharging the retained solids by stretching the fibre pores and washing out solids retained in the pores by application of gas under pressure.

11 Claims, 5 Drawing Sheets

CONCENTRATION OF SOLIDS IN A SUSPENSION

FIELD OF THE INVENTION

This invention relates to the concentration of fine solids in a liquid feed suspension.

The problem of concentration of fine solids in a suspension is complementary to the problem of recovering clear liquid from that suspension.

BACKGROUND ART

The producers of clear liquids usually regard all visible traces of solids as wastes. The methods used often involve the addition of flocculants and filter aids which contaminate the solids. The solids content tends to be low, encouraging the use of methods which remove clear liquid from a continuously fed feed suspension tank in which the solids content increases until some deleterious effect arises, necessitating the dumping of the contents of the feed suspension tank into some other device. Invariably the accumulating solids have been steadily slowing production and productivity could benefit from some device which continuously rejected concentrated solids.

In contrast thereto, the producers of finely divided solids are usually food, mining or manufacturing industries for which the solids are desired and the liquid is best recycled. Also, the solids have specifications for size and purity, often need further processing and mostly need to be obtained at high solids content as concentrates. Filter aids will, of course, contaminate the product.

A detailed recent discussion of such needs in cross flow microfiltration is given by R. Bertera, H. Steven and M. Metcalfe, *The Chemical Engineer*, pp. 10–14, June, 1984.

As shown in FIG. 8 of the above publication even the latest 1984 commercial Enka Membrana A.G. filter module rapidly fouled and the clarified liquid flux continued to decline when backwashed with transmembrane clarified liquid in the constant concentration cross flow (diafiltration) mode on a fine inorganic filler.

Economically, the ability to cope with strongly fouling solids without filter aids is most pressing. This fouling problem has long been recognised and the art records some attempts to substitute gas for clarified liquid during backwashing to avoid the recycle of clarified liquid to the feed suspension. Thus Japanese unexamined Patent Kokai Publication No. 53(1978)-108882 states:

"Since the filtrate is not used in the present invention for membrane reverse cleaning, the serious defect of the prior art method, that is, returning the filtrate substantially to the crude liquid is eliminated, with obvious industrial merits."

Transmembrane gas backwashing is impossible in very finely pored filters such as reverse osmosis membranes and ultrafilters because the pressures needed to overcome surface tension are far beyond the strengths of normal hollow fibre membranes used for these purposes; wetting liquids may pass but not gases. Any gas bubbles passing through such a membrane indicate the presence of pin hole defects in the membrane. Hence this invention has no application to reverse osmosis or to true ultrafilters.

This invention is concerned with microfilters which contain larger pores than those of ultrafilters and which range from 0.01 to 10 microns. Usually, the larger of the pores are so distributed that clarified liquids are free of all visible turbidity. Turbidity involves more than particle size, obeying and arising from well known optical laws.

Early microfilters fouled quickly since they treated particles which were not suspended by Brownian motion nor diffusion but which penetrated into the pores of a similar size range as the particles in the manner of sieve blinding.

One prior art approach to solving this problem was to operate hydrophilic microfilters in a cross flow mode with clarified liquid transmembrane backwash. High cross-flow velocities required feed suspension to be to the smaller internal filtering surface of the lumen as opposed to the larger external surface of the fibre. Thus, backwash pressures had to be limited to avoid fibre crushing. The smaller filtering surface reduced output and thus this approach was frequently not a useful solution to the fouling problem.

Another prior art approach is disclosed in Japanese Patent Kokai Publication No. 53(1978)-108882 where a hollow fibre bundle in loose "candle" configuration of hydrophilic "polyvinyl alcohol (PVA)" fibres was made to writhe during long (one minute) lumenal backwashes with air. Filter "candles" of the kind described in this Japanese specification are more akin to dead-end filters than to cross-flow shell and tube filters in that they are in the form of elongated hollow pots closed at one end.

The Examples and the single claim of the above Japanese specification make it clear that the invention disclosed therein relies upon the flow of air down the lumens causing the closed ends of the fibres to oscillate or vibrate and thereby free the fine iron colloid left by the 50 parts per million feed suspension in the pressurised feed suspension pot. The Japanese specification states:

"with such measure [lumen gas alone], the deposited fine particles may be removed solely by the introduction of compressed air".

Our experience suggests that this was because the "iron colloid" was much coarser than the pores and was restricted entirely to the surface of the fibres. Other fouling materials spread over a spectrum of sizes such as crude sugar cane juice or starch waste would have been more difficult to clean.

A development of the above "candle" configuration of hydrophilic "polyvinyl alcohol (PVA) type polymer" porous hollow fibres is to be found in U.K. Patent specification No. 2,120,952. The test suspension described in this specification contained only 5 ppm of iron oxide with an average particle size of 0.6 microns and again the relationship of particle size to pore size would ensure that cleaning was not difficult to perform. The writhing of the fibre bundle was somewhat restrained by taping the fibres loosely and enclosing them in an open sleeve which avoided the tangling and fibre breakage of the earlier mentioned Japanese Kokai Publication No. 53(1978)-108882 but the gas backwash took 5 minutes.

It should be noted that the relevant prior art uses only one type of fibre namely a polyvinyl alcohol fibre which is intrinsically hydrophilic. However, had the non-wetting iron colloids been used with hydrophobic fibres such as polypropylene fibres the gas backwash would have caused pore blockage.

This gas blockage is predicted by the theory behind "bubble point" measurement. Such gas blockage is serious in practice. As far as we are aware the prior art does not disclose gas backwashing with fibres which are intrinsically hydrophobic and had it been proposed the gas blockage effect would have been encountered after gas backwash lasting from one to five minutes.

The prior art contains one other report of gas backwashing through an even less relevant "candle in the pot" configuration but using thermoset rather than thermoplastic polymers to give a chemically resistant hydrophilic filter.

This report is contained in Soviet Union Patent No. 955,986 which concerns the use of massive (250 mm long, 70 mm bore and 25 mm walls) pots made by an undisclosed process from polished hard microspheres of thermoset phenol/formaldehyde, resorcinol/formaldehyde, pyrocatechin/formaldehyde or melamine/formaldehyde. The microspheres ranged from 0.5 to 5 microns in diameter, giving pores of 0.1 to 1.6 microns. The pores were penetrated 0.3 to 0.5 mm by the fine mineral particles. While apparently adequate for the use described in the Russian specification, the apparatus is incompatible with cross-flow configuration and minimal clarified liquid backwash.

Although prior art microfilters can recover fine solids from a liquid suspension, their operation in that regard has not been commercially successful. One reason for this has been the failure to recognise that efficient and rapid removal of the fine solids from the filtering medium is complicated by the variations in the sizes of the pores, the nature and physical characteristics of both the solids and the filtering medium and the need to stretch the pores to release retained solids.

Another reason why prior art microfilters have not been commercially successful in removing fine solids is that the fibres used have had rather poor resistance to strong hydrochloric acid and sodium hydroxide which are often used for removing from the filter natural products present in feedstocks that foul the fibres of the filters.

In addition, the hollow fibres of prior art microfilters can be rapidly destroyed by hypochlorite, chlorine and hydrogen peroxide which are routinely used for sterilisation and cleaning.

Another disadvantage of the prior art is that removal of the fouling species from the filter vessel is not carried out until after the backwash cycle is completed which increases the down time of the filter.

DISCLOSURE OF INVENTION

It is an object of this invention to provide a method of concentrating the solids of a liquid suspension using a cross-flow separation mode and a reverse-flow or backwash mode for discharging retained solids to ensure rapid removal of the retained solids and in which the separation and discharging modes may be repeated for prolonged periods of time.

It is a further object of the invention to provide a method of concentrating the solids of a liquid suspension that can utilise elastic, microporous hollow fibres that can withstand the chemical environment of commercial filtration situations as well as the repetitive stretching that occurs during cyclical operational modes.

According to the invention there is provided a method of concentrating the solids of a liquid suspension comprising the steps of:
(i) applying the liquid suspension to the outer surface of elastic, microporous, hollow fibres within a shell or housing whereby:
 (a) some of the liquid suspension passes through the walls of the fibres to be drawn off as clarified liquid from the fibre lumens,
 (b) at least some of the solids are retained on or in the fibres or otherwise within the shell with the non-retained solids being removed from the shell with the remainder of the liquid,
(ii) discharging the retained solids from the shell by applying through the fibre lumens:
 (a) a pressurised liquid which passes through substantially all the pores whereby substantially all of the pores are stretched to wash out any retained solids followed by,
 (b) a pressurised gas which passes through the larger pores to stretch those pores to dislodge any solids retained in those pores and to wash the external walls of the fibres and the interior of the shell to remove all solids from the shell to an external collection point.

In one form of the invention, the application of the pressurised gas is initially conducted so as to backwash the full length of the fibres by displacing any lumen liquid with gas at a pressure below the bubble point of the walls of the fibres. The shell is then sealed with the relatively incompressible feed liquid so that gas cannot flow through the fibre walls as the pressure of the trapped gas is raised beyond the bubble point. The liquid seal is then released to allow the trapped gas to escape substantially uniformly through the fibre walls even at the most distant point from the lumen inlet thus minimizing subsequent preferential washing of pores near the gas inlet.

Preferably, the method of the invention is carried out as a continuous process utilising a repetitive cycle of solid accumulation and solid discharge. It will be appreciated that in an ideal fibre, the pressurised liquid should pass through all the pores, however, in reality some of the pores have comparatively thinner walls which may crush to block those pores.

The resumption of the flow of feed suspension through the fibres after the solids discharging step may be delayed for sufficient time to allow the expanded pores to recover to their original size so that over-sized particles from the feed suspension will not be able to pass into or through the enlarged pores.

In some cases, the resumption of feed flow can be delayed by the action of the gas itself if it is applied at a pressure higher than that of the feed suspension. As the pressure of the gas falls at the end of the discharge step, the pores of the fibres will start to recover and will return to their original size before the gas pressure drops below the pressure of the feed whereat flow of part of the feed through the walls of the fibres is resumed.

If desired, the flow of treated feed suspension from the shell or housing is controlled by valve means so that a back pressure may be applied to the feed and such valve means can be used to control the ingress of feed suspension during the reverse flow of the pressurised liquid and gas.

According to another aspect of the invention there is provided a concentrator for recovering fine solids from a liquid feed suspension comprising:
(i) a shell,
(ii) a plurality of elastic, hollow, microporous, polymer fibres within the shell,
(iii) means for supplying pressurised feed suspension to the outside of the fibres,
(iv) means for withdrawing clarified liquid from the fibre lumens,
(v) means for applying liquid followed by gas under pressure to the fibre lumens to effect a transmembane cleaning of the fibres, the pressure of the liquid being sufficient to stretch substantially all of the pores of the fibres and the pressure of the gas being sufficient to ensure that the gas will pass through the larger pores of the fibres to dislodge any solids retained therein and to wash the external walls of the fibres and the interior of the shell to remove all solids from the shell to an external collection point.

In a preferred form of the invention, the concentrator includes means for sealing the relatively incompressible feed suspension in the shell upon displacement of liquid from the fibre lumens by the pressurised gas so that the gas may be trapped in the lumens at a pressure above the bubble point of the fibre walls and means to allow the sudden release of the gas substantially uniformly through the fibre walls.

Preferably, the fibres are made from thermoplastic polymers such as:

poly(propylene), poly(4-methylpent-1-ene), co-polymers of propylene, poly(vinylidenedifluoride), poly(sulphones), poly(phenylene sulphides), poly(phenylene oxides), phenoxy resins, poly (tetrafluoroethylene) and poly(chlorotrifluoroethylene).

Such fibres are inexpensive and possess the desired elasticity, flex crack resistance and pore size which make them suitable for use at various temperatures.

Although the choice of fibre will depend upon the nature of the feed suspension to be treated, in general terms, the fibres will be selected so that:
(a) the pore size distribution removes the smallest desired particle as is required in the case but,
(b) some of the pores of the fibres will pass air and all are below 10 microns in diameter, and
(c) the fibre resists strongly acidic or basic cleaning solutions and is resistant to repeated heat or chemical sterilisation, and
(d) the properties of the fibre allow elastic stretching of the pores when all the pores are pressure cleaned by a volume of clarified liquid at least equal to the total pore volume followed by,
(e) a gaseous pore-stretching clean at a pressure sufficient to force gas through a substantial fraction of the larger pores to clean the solids off the fibre surface and the shell wall, helping to propel the solids into a means for diversion out of the system of the accumulated solids to collection ports, and
(f) the elastic properties of the fibres allow a rapid recovery of pore size after stretching before return of the feed suspension so that no oversize pores pass or entrap the material being concentrated.

If desired, the abovementioned elastic polymeric fibres may be coated with strong acid and base resistant stable hydrophilic coatings. Suitable hydrophilic composite fibres comprising a hydrophobic microporous thermoplastic elastic base having a cross-linked hydrophilic coating on the walls of the pores are described in our co-pending International Patent Application No. PCT/AU84/00179.

In the course of the gaseous discharge step, the gas will displace feed and/or clarified liquid from those pores of the fibres which have a bubble point less than the pressure of the gas. In the case of polypropylene and other hydrophobic fibres, these pores will become air-blocked, but, this can be overcome in a number of ways, for example:
(a) subjecting the hydrophobic fibres either prior to or during cross-flow operation to a plug flow of a wetting agent so as to reduce the surface tension of the feed to the shell below 50 (preferably 32 to 35) dynes per centimeter at which the pore will be hydrophilic and repeating the treatment at successively lengthening intervals as traces of hydrophilic feed absorb onto the hydrophobic fibres,
(b) subjecting the hydrophobic fibres, either initially or after option (a) above, to sufficient feed pressure to shrink the gas bubbles retained in the pores of the fibres so as to aid their passage from the pores and to maintain sufficient solubility of the gas in the feedstock and/or the permeate.

BRIEF DESCRIPTION OF THE DRAWINGS

In order that the invention may be more readily understood and put into practical effect, reference will now be made to the accompanying drawings in which.

DESCRIPTION OF PREFERRED EMBODIMENTS

Figure 1:
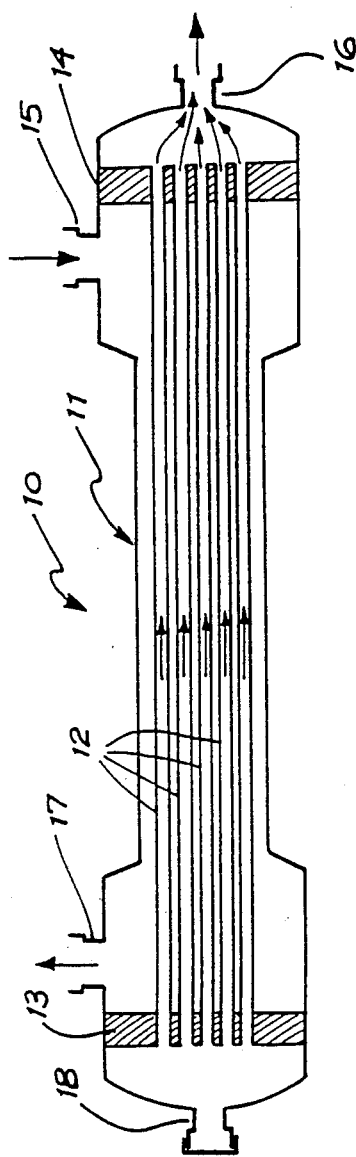
FIG. 1 is a schematic view of a hollow fibre cross-flow concentrator shown in its concentrating or operating mode.
Figure 2:
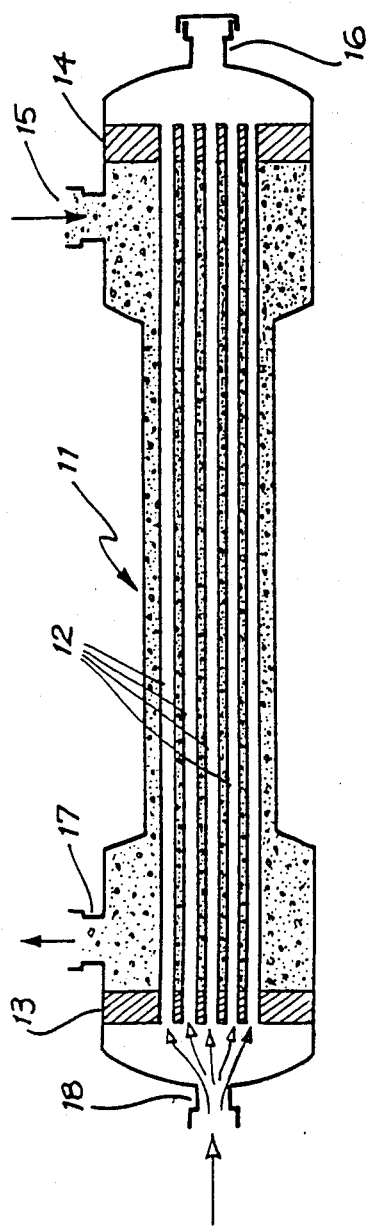
FIG. 2 is a schematic view similar to FIG. 1 with the concentrator shown in its reverse flow cleaning mode.

The hollow fibre cross-flow concentrator 10 shown in FIGS. 1 and 2 includes a cartridge shell 11 within which is positioned a bundle of hollow, porous, polymeric fibres 12. In this instance, each fibre is made of polypropylene, has an average pore size of 0.2 micron, a wall thickness of 200 micron and a lumen diameter of 200 micron. There are 3,000 hollow fibres in the bundle 12 but this number as well as the individual fibre dimensions may be varied according to operational requirements.

Polyurethane potting compound 13,14 holds the ends of the fibres 12 in place without blocking their lumens and closes off each end of the shell 11. The liquid feed suspension to be concentrated is pumped into the shell 11 through feed suspension inlet 15 and passes over the external walls of the hollow fibres 12. Some of the feed suspension passes through the walls of the fibres 12 into the lumens of the fibres to be drawn off through the lumen outlet port 16 as clarified liquid.

The remaining feed suspension and some of the rejected species flows between the fibres 12 and leaves the shell 11 through outlet 17. The remainder of the rejected species is held onto or within the fibres or is otherwise retained within the shell. Lumen inlet port 18 remains closed during the operating mode of the concentrator shown in FIG. 1.

In order to remove the retained species, lumen outlet port 16 is closed so that the flow of clarified liquid is stopped. Pressurised clarified liquid is then introduced into the lumens through lumen inlet port 18 to stretch substantially all of the pores and to wash them with at least the total pore volume of clarified liquid. Upon completion of the clarified liquid purge, compressed gas is introduced through lumen inlet port 18, along the lumens of the fibres 12 and through the walls of the fibres into the feed suspension/concentrated stream causing violent bubbling which purges the shell of any retained species which may have built up on the outer walls of the fibres or may have been washed from within the pores of the fibres by the clarified liquid purge.

In one embodiment of the invention (which is particularly suitable for long thin fibres), the compressed gas is introduced through inlet 18 and along the lumens of the fibres 12 after opening the lumen outlet port 16 for a limited period so that no gas penetrates the pores of the fibres at this stage. The liquid-filled shell is then sealed by closing shell inlet 15 and shell outlet 17. Gas still cannot penetrate the porous walls even though the gas pressure is now raised well above the normal bubble point of the fibre walls because the liquid within the shell is relatively incompressible. A reservoir of high pressure gas is thus accumulated in the fibre lumens.

The shell outlet 17 is then opened which allows gas to penetrate the pores along the whole length of each fibre. Initially, the surge of bubbling gas is substantially uniform but ultimately is slower at the end remote from lumen inlet port 18 due to the viscous pressure drop along the thin fibres. In extreme cases, it is desirable to admit gas through both lumen ports 16 and 18 after carrying out the above described pressurised, trapped gas operation.

It is preferred that the resumption of feed suspension flow after gaseous cleaning be delayed for sufficient time to enable the pores that have been stretched by the gas to recover to their original size so that over-sized particles from the feed suspension will not be able to pass into or through the enlarged pores.

Figure 3:
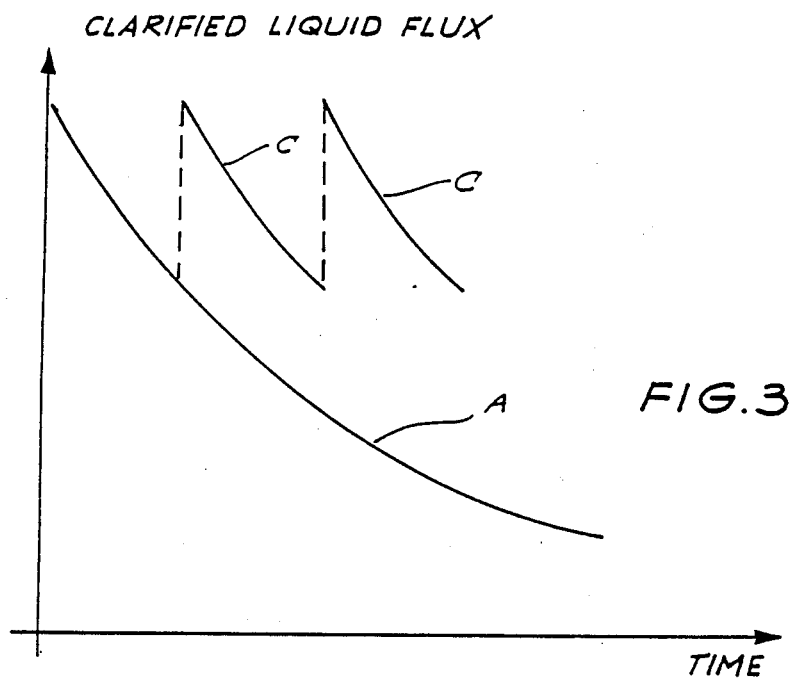
FIG. 3 is a graph of clarified liquid flux against time for a hollow fibre cross-flow concentrator

FIG. 3 shows the effect of the solid discharges described in relation to FIG. 2 upon the rate of production of clarified liquid. Curve A shows the decay of clarified liquid flux against time without discharge of solids, whereas Curves C show the recovery of clarified liquid flux after each combined liquid and gaseous discharge cycle. Although the discharge of solids returns the clarified liquid flux to almost the initial value, a decrease in efficiency flux may occur over an extended period of time notwithstanding successive discharges.

Figure 4:
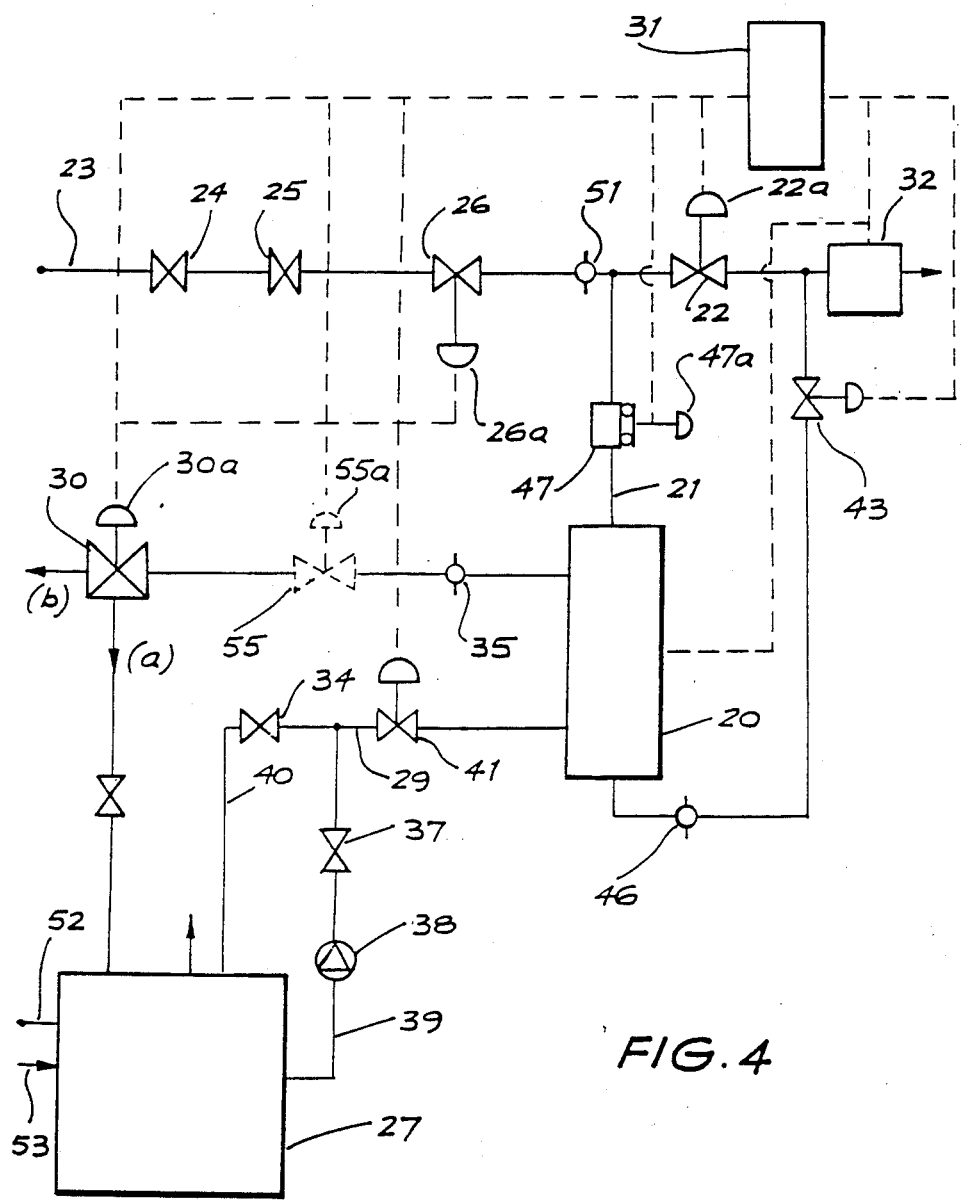
FIG. 4 is a schematic diagram of a gaseous reverse flow cleaning system according to one embodiment of the invention.

The clarified liquid/gaseous discharge technique of the invention can be implemented using the system shown in FIG. 4 which operates in a number of modes. In the cross-flow concentration mode, the pump 38 draws feed suspension from the feed suspension tank 27 through pump suction line 39 thence through inlet pressure valve 37 and delivers it through feed suspension inlet 29 (having a feed suspension stop solenoid valve 41) to the cross-flow concentrator 20.

Feed suspension passes over the surface of the hollow fibres inside the cross-flow concentrator 20 and some of the fluid passes through the fibres into the lumens to be delivered to the clarified liquid outlet line 21. The clarified liquid in line 21 passes through clarified liquid hold-up cylinder 47 which is operated by solenoid 47a, clarified liquid control valve 22 controlled by solenoid 22a and flow sensor 32 to a clarified liquid collection point.

Concentrated feed suspension from the cross-flow concentrator 20 passes through the check valve 35 and the solenoid-operated shell sealing valve 55 (when fitted) into line 28 from which it is delivered to the three way concentrate divert valve 30 controlled by solenoid 30a. The valve 30 has outlet paths (a) and (b) which lead to the feed suspension tank 27 and to a concentration collection point respectively. In the concentration mode, the valve 30 is in position (a) so that the concentrated feed suspension passes through back pressure valve 33 into the tank 27.

A bypass valve 34 in bypass line 40 is set to control, together with the inlet pressure valve 37, the flow rate through the cross-flow concentrator 20. The feed suspension tank 27 has a feed suspension inlet 53 and a washing inlet 52.

Gas is introduced as required through line 23 which includes a gas pressure control valve 24, a gas flow valve 25, gas stop valve 26 controlled by solenoid 26a and check valve 51.

The suspension inlet pressure, concentrated suspension outlet pressure and clarified liquid pressure are controlled or set by the valves 37, 33 and 22 respectively. During the concentration mode valve 26 is closed, valve 55 is opened and valve 30 is set to path (a). In this embodiment of the invention, the pressure in the concentrator shell 20 is set to remove gas in the filter pores within a predetermined time upon resumption of the concentration mode after backwash by clarified liquid followed by gas.

The liquor issuing from valve 22 is monitored by flow sensor 32 and the parameters sensed are used as inputs to the programmable controller 31. The controller 31 compares the actual flow rate of the clarified liquid with preset values of flow rate and time to initiate a discharge cycle.

In this embodiment of the invention, there are two separate criteria for determining the appropriate time to discharge the concentrator 20. The first criterion is the discharge flow rate and once it has decreased to a predetermined and set rate the controller 31 initiates a a discharge cycle. The second criterion is time where the controller initiates a discharge cycle at fixed time intervals. The second criterion is more appropriate for feed suspensions where the liquor flow rate does not decline very rapidly.

To effect a discharge, the programmable controller 31 sets the system to discharge mode by actuating solenoids 22a, 26a, 43a and 30a which in turn close valve 22, open valve 26, close valve 43 and change the outlet path of the three way concentrate divert valve 30 to path (b) so that the subsequent variable volume clarified liquid hold up and the gaseous discharge medium as well as the material dislodged from the fibres can be discharged from the system.

The solids discharge is then initiated by the programmable controller 31 which actuates solenoid 26a to open gas valve 26 and the solenoid 47a of clarified liquid hold up cylinder 47 so that the liquid content of that device is discharged under pressure from gas supplied through valve 26 into the lumens and across the fibres in the reverse direction to normal operation so as to expand all the pores and to displace any solids lodged within the pores of the fibres.

After the hold-up cylinder 47 has been emptied, programmable controller 31 continues gas flow through valve 26 and line 21 into the lumens and through the larger pores of the fibres to wash concentrate and solids off the fibres and the interior of the shell. Valve 26 is closed by solenoid 26a at the end of the gas discharge time.

To achieve more uniform gas discharge through the larger pores along the full length of a narrow fibre, it is preferred to vent the gas, after hold-up cylinder 47 has been emptied, through the lumen check valve 46 and lumenal stop valve 43 (which has been opened by programmable controller 31 actuating solenoid 43a). The controller 31 then closes shell sealing valve 55 by actuating solenoid 55a and feed stop valve 41 by actuating solenoid 41a so that gas pressure builds up within the shell 27 to the full pressure set by the gas pressure regulator 24. Shell sealing valve 55 is then opened for the predetermined gas discharge time by the controller 31 actuating solenoid 55a. At the end of the discharge cycle time, programmable controller 31 returns the system to the concentration mode as described above, except that valve 22 is kept closed until the hold up cylinder 47 is filled with clarified liquid.

For the processing of some feed suspensions, particularly at high feed pressures, it may be desirable to terminate the flow of feed suspension during discharge in which case the controller 31 is programmed to actuate solenoid 41a so as to close valve 41 at the start of discharge and to open valve 41 at the end of discharge. This avoids dilution of the concentrate with feed suspension and ensures that the expanded pores have time to recover in size thus preventing oversize solid entry.

With some feed suspensions, it may be desirable to collect the retained species in fractionated concentrate form. There is a number of options which can be used in the operating mode of the concentrator system shown in FIG. 4 to make such collection of retained species more effective and efficient. For example, because some retained species accumulate at the membrane surface more quickly than other retained species, it is possible to enrich a concentrate stream in one retained species over another in successive stages, with the added advantage of enabling a greater overall flux rate. To effect such an enrichment, retained species concentrated at the fibre surface can be diverted to different destinations as a batch of feed suspension is processed, or, for a staged continuous system, diverted concentrate fluid is collected in different vessels for each stage.

Non-rejectable species such as salts can be removed from the retained species by effecting a washing cycle. In the washing mode, feed suspension water from the feed suspension inlet 53 is turned off and clean water inlet 52 is opened to rinse the retained species at the same rate as the clarified liquid discharge flow rate. The wash time is determined from the residence time or half life of the system using standard engineering calculation techniques.

The invention will now be further described by reference to the following examples of which Examples 1 to 5 were carried out using a concentrator as shown in FIG. 4 but without a shell sealing valve 55, the check valve 46 and the stop valve 43.

EXAMPLE 1

A liquid feed suspension was formed by adding 281.9 grams of freshly precipitated fine calcium carbonate to 146.2 grams of freshly precipitated gelatinous aluminium hydroxide in 78.3 liters of water. The hydroxide is much smaller in particle size than the carbonate but will foul much more quickly on 0.2 micron hollow fibres of hydrophilized polypropylene. Thus, to obtain rapid recovery of the concentrate, the hydroxide must be rejected first.

The liquid feed suspension was passed into a cross-flow concentrator of the kind described above in which the hollow fibre area was one square meter with clarified liquid and air transmembrane backwashing. The shell inlet feed suspension pressure was 200 kPa and the outlet pressure was set at 100 kPa. The clarified liquid flow was not throttled. Transmembrane backwashing was carried out with clarified liquid and air at 500 kPa when the clarified liquid production rate fell below 80% of its last regenerated value.

Initially, the concentrator was run twice in the dead-end mode and rapidly declined in productivity. The time taken for the clarified liquid production rate to drop to 80% of the initial rate was noted both times. The solids content of the feed suspension increased as clarified liquid and diverted solids were discharged from the system and the average solids content of the changing feed suspension was calculated from the analyses of diverted solids and clarified liquid volumes.

The analysis of the diverted solids for aluminium and calcium allowed the selective rejection of the aluminium to be estimated. The early selective rejection of the rapid foulant was crucial for rapid concentrate recovery.

Whilst aluminium was being rejected, the time in seconds for 20% fouling drop in discharge rate lengthened, indicating less fouling. This time is defined as a "20% fouling index" of practical utility, but, needs correction to provide a uniform solids content of the feed suspension at that time. The feed suspension solids concentration continually rises during the clarification mode of the concentrator system as clarified liquid was discharged rapidly and the effect of this is to shorten the fouling time and to oppose the aluminium selective rejection effect which lengthens the fouling time.

An approximate correction is made by multiplying the 20% fouling index by the solids content of the average feed suspension at the time. Thus, the corrected fouling index approximately equals the 20% fouling index at one gram/liter solids content. Accurate comparisons are best done in the constant concentration (washing) mode when the feed suspension is kept at constant concentration.

After the dead-end mode tests were completed, the system was altered to the cross-flow operation in the clarified liquid and air discharge mode. Again, the results of the two backwashes were averaged and the experiment repeated. The experimental results showing the effect of selective diversion of fast fouling solids on reducing fouling frequency and increasing overall permeation rate are set forth in Table I.

The cross-flow filtration with liquid and then air discharge mode showed treble the rate of selective aluminium hydroxide rejection than the dead-end mode, illustrating the superiority of the cross-flow mode over the unstirred feed suspension "candle" or dead-end mode. The improved aluminium hydroxide rejection rate lengthened the corrected times between backwashes by 285% over the corrected times for the dead-end mode of operation.

The residual 20.3 liters of concentrate was analysed. The concentrator was well washed and air purged. The residual concentrate was 13% depleted in aluminium because of the selective rejection into the diverted fractions. The tenaciously held material in the concentrator was easily removed by hydrochloric acid.

EXAMPLE 3

Example 2 was repeated using a transmembrane pressure of 50 kPa and a cross-flow rate of 3,600 liters/hour at 25° C. The hydrophobic fibres quickly blocked with air and the permeation rate fell to 75 liters/square meters/hour.

The inlet feed suspension pressure was then raised from 60 kPa to 65 kPa which gave a flux rate of 113

TABLE 1

EFFECT OF SELECTIVE DIVERSION OF SOLIDS ON REDUCING FOULING FREQUENCY AND INCREASING OVERALL CLARIFIED LIQUID PRODUCTION RATE

| | STARTING MIX | DEAD -END | FIRST CROSS -FLOW | SECOND CROSS -FLOW | RESIDUALS | REMARKS |
|---|---|---|---|---|---|---|
| Feed suspension Solids g/l | 5.47 | 6.87 | 10.07 | 13.12 | 14.46 | 1. Rises as liquid leaves the recycle |
| Diverted Solids Ca/Al | 2.24 | 1.95 | 1.48 | 1.45 | 2.73 | 2. Lower ratios in diverted solids shows success |
| Diverted % Al increase | — | 10% | 30% | 32% | −13% | 3. Diverted solids rich in Al as desired |
| Uncorrected time (seconds) for 20% clarified liquid production drop (as defined above) | — | 365 | 404 | 545 | | 4. Fouling rates decrease absolutely |
| Corrected time (seconds g/l) for 20% clarified liquid production drop (as defined above) | — | 2504 | 4068 | 7144 | | 5. Fouling rates decrease very rapidly when compared on the same solids basis |

EXAMPLE 2

City water was passed into a cross-flow concentrator containing a bundle of 2,500 hydrophobic polypropylene fibres each of which was 500 mm long and of 200 micron bore with a 200 micron wall thickness. The fibres had been prewetted with isopropanol. The inlet feed suspension pressure was 60 kPa and the outlet pressure less than 2 kPa with no measurable clarified water back pressure. Hence, the average transmembrane pressure was 29 kPa.

Liquid then air discharging was carried out at 500 kPa for 6 seconds every 2 minutes. After a few cycles, the liquor discharge rate fell from 480 liters/square meter/hour to 100 liters/square meter/hour due to air lodging in the larger pores of the fibres and resisting the rather low 29 kPa transmembrane pressure. Further discharging with air resulted in a virtually complete blockage of the fibres by the air.

In separate repetitions of this experiment, the air blockage was slowly cleared by:
(a) Raising the average transmembrane pressure,
(b) raising the feed suspension flow rate,
(c) under-saturating the feed suspension with air at the concentrator operating conditions,
(d) a combination of (a) and (b), and,
(e) a combination of (a), (b) and (c).

Recovery of discharge liquor flow rate was also obtained by lowering the surface tension.

The effect of temperature on the feed suspension was somewhat complicated in that low temperatures favoured gas solubility and high temperatures favoured gas diffusion. These effects tend to cancel out one another until near boiling temperatures when very poor air solubility gives very slow clearance and only pressures beyond the bubble point gave satisfactory results.

liters/square meter/hour which remained stable over a 10 minute test period.

Table II shows the results obtained by raising the inlet feed suspension pressure in steps from 85 kPa to 322 kPa:

TABLE II

EFFECT OF INCREASING FEED SUSPENSION PRESSURE TO BUBBLE POINT ON CLARIFIED LIQUOR DISCHARGE RATE

| FEED SUSPENSION PRESSURE (kPa) | CLARIFIED LIQUOR DISCHARGE RATE LITER/ SQUARE INITIAL | METER/ HOUR FINAL | TIME ELAPSED (Minutes) |
|---|---|---|---|
| 85 | 139 | 113 | 26 |
| 105 | 138 | 124 | 14 |
| 125 | 157 | 128 | 26 |
| 148 | 157 | 141 | 5 |
| 168 | 171 | 156 | 13 |
| 190 | 189 | 163 | 15 |
| 210 | 211 | 200 | 4 |
| 233 | 200 | 189 | 11 |
| 255(*) | 211 | 248 | 11 |
| 295 | 360 | 360 | 9 |
| 322 | 360 | 360 | 7 |

(*) bubble point; note the first evidence of blockage clearing after the bubble point is exceeded.

The feed suspension was then modified by adding 0.02% w/v of sodium benzenesulphonate in solution so as to assist the removal of air blockages. The results obtained at various inlet pressures are shown in Table III:

TABLE III

USE OF SURFACTANT TO REMOVE AIR BLOCKAGES

| FEED SUSPENSION PRESSURE (kPa) | CLARIFIED LIQUID DISCHARGE RATE | | TIME ELAPSED (Minutes) |
|---|---|---|---|
| | LITER/ SQUARE METER/ HOUR INITIAL | LITER/ SQUARE METER/ HOUR FINAL | |
| 322 | 480 | 480 | 2 |
| 100 | 280 | 370 | 20 |
| 322 | 1100 | stable | 2 |
| 85 | 470 | | back to full wetting |

It will be noted from the above results that the hydrophobic fibres initially blocked very quickly with the liquid/gas discharge. The application of feed suspension transmembrane pressure gave some increase in rate but no more (actually less in some cases) than expected for the greater hydraulic pressure on the same few open pores. The permeation rates tended to fall off slowly suggesting fibre pore compression or fouling outweighed any slow air diffusion from the pores.

At the bubble point, there was a sharp increase in clarified liquid production rate which then rose slowly but steadily. Air could be seen leaving in the clarified liquid.

A shock load of wetting agent added to the feed suspension had a dramatic effect on the clarified liquid production rate. As expected, it was found better to apply a concentrated slug of wetter than the same amount in dilute solution.

The results indicate that hydrophobic fibres are best made permanently hydrophilic by an insoluble hydrophilic coating if liquid and air discharge is to be used. Certainly this holds for the smaller pores which are best kept full of liquid and may become blocked with gas if left in their intrinsically hydrophobic state. In the gas-blocked state they are more difficult to rewet by raising feed pressure than the larger pores, some of which are swept by gas at every gas backwash since the gas backwash pressure exceeds their bubble point but rapidly cleared if the feed suspension pressure exceeds the bubble point. Pores with bubble points between these two pressures are hardest to keep wet.

When hydrophobic fibres are used in the cross-flow mode a small slug of suitable surfactant may be applied to the feed suspension. In the case of potassium oleate surfactant, this would be eliminated safely by dilute calcium salts in the feed suspension tank to form an insoluble calcium oleate which is rejected by the fibres.

If surfactant addition is not acceptable, the temperature in the fibres should be dropped and the feed suspension should be applied at the highest transmembrane pressure permissible at the temperature. The concentration system is then run at that pressure until the clear liquid production rate no longer increases due to removal of air blockages.

Both the above treatments must be repeated as gas blockage recurs. With biological substances in the feed suspension, such as sugar, juice, milk, starch waste and brewery waste, the fibres quickly become hydrophilic due to adsorption of hydrophilic substances and the above remedies are usually only needed for the first few hours of use. The hydrophilic substances are often removed by chemical cleaning procedures so that the above treatments must be repeated.

EXAMPLE 4

A 50 liter sample of hydrolysed wheat starch was strained through a 50 micron screen and the fatty acids were decanted to give a turbid suspension. This was passed through the apparatus of FIG. 4 using a polypropylene hollow fibre concentrator using the diversion path of divert valve 30 and without valves 55, 46 and 43. The fibres were previously wetted with a surfactant solution, pumped through under pressure to give rapid wetting, followed by a water rinse. The feed suspension pressure was 200 kPa with a backpressure of 160 kPa and a clarified liquid production rate of 58 L/hour which declined after 24 minutes to 31 L/hour.

The fibres were then backwashed by the small volume of clarified liquid in the clarified liquid line, which exceeded the total fibre pore volume, in a shock wash, driven by suddenly applied air at 500 kPa. The air then followed for 10 seconds. The fibre pores had been shown to stretch slightly at 400 kPa and to stretch well at 500 kPa.

At once the rate of production of clarified liquid returned to the original 58 L/hour. Over a further period of 15 minutes the rate of clarified liquid production again fell to 31 L/hour. The wash cycle was repeated to return the rate again to the original 58 L/hour. The whole cycle was again repeated to give a replica of FIG. 3.

This difficult suspension had the concentrated solids removed rapidly to yield a sticky concentrate and a clear pale brown clarified liquid. The methods of the invention worked well. In particular the need of gas to expand at the fibre surface and to clean the surface cake of concentrate was confirmed by examination through the transparent shell of the concentrator.

EXAMPLE 5

A concentrator made from composite hydrophobic polypropylene hollow fibres which possessed pores lined with a hydrophilic cross-linked polyamide was used to concentrate a waste egg mucin. The concentrator had a transparent shell. At 100 kPa feed suspension average pressure the initial clarified liquid rate was 20 L/hour but this fell to 12 L/hour in 20 minutes.

Thick mucin could be seen coating the fibres and it seemed that the surface gel layer was limiting rates. A test of this hypothesis was carried out by reverse flowing air alone at 500 kPa. This gave visual evidence of the removal of the surface concentrate accumulation but the clear liquor production rate only rose to 15 L/hour.

A pressurised reverse flow with clarified liquid at a pore-stretching 500 kPa for only 5 seconds to displace the pore volume within the pores returned the rate to the original 20 L/hour. It was found that a first wash with clarified liquid for 5 seconds, then a 3 second air wash when both were at a pore-stretching 500 kPa allowed the recovery of the mucin at the same rate even when threefold higher concentrations of mucin were used.

Thus, it can be seen that the pore-stretching clarified liquid reverse wash is effective in all pores in the removal of material within the pores but does not significantly remove surface concentrate. The action of the gas is most beneficial to remove surface concentrates which form gel-limiting layers. The joint action is essential.

EXAMPLE 6

Comparative filter runs using ferric hydroxide as a feedstock were made with a concentrator as shown in FIG. 4 and with one not having valves 43, 46 and 55. It was found that the backwash achieved in the former (by first pressurising the lumens with the shell sealed and then releasing the pressure) cleaned the fibre bundle with half the cycles required for the modified concentrator.

EXAMPLE 7

Example 6 was repeated using vanilla extract as the feedstock and similar results were obtained.

EXAMPLE 8

A feed suspension was formed with 2.5 grams/liter of bentonite and 2.5 grams/liter of diatomaceous earth at 43 degrees Celsius. The feed was treated in a hollow fibre cross-flow concentrate as described above in accordance with the system of FIG. 4 using a pulsed clarified liquid backwash from the hold-up cylinder 47 equal only to the pore volume. Uniform gas discharge was effected for four seconds every ten minutes.

Figure 5:
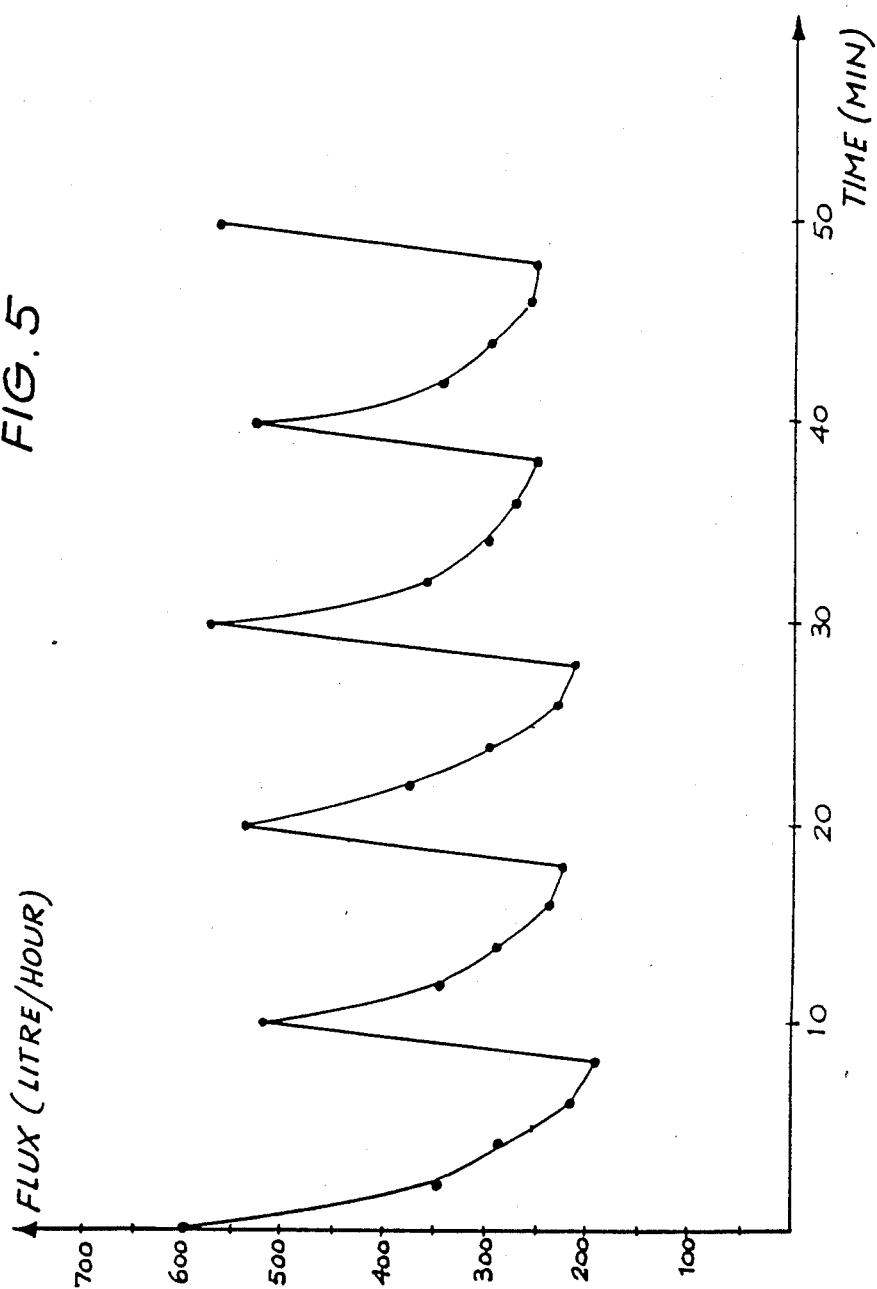
FIG. 5 is a graph of clarified liquid flux against time for a hollow fibre cross-flow concentrator using liquid and air backwash, and, FIG. 6 is a graph of clarified liquid flux against time for a hollow fibre cross-flow concentrator using clarified liquid backwash only.

The concentrator initially passed tap water at 800 liters/hour. The bentonite/diatomaceous earth suspension stabilised at an average peak flux of 576 liters/hour with an average transmembrane pressure of 150 kPa as shown in FIG. 5.

The apparatus was then washed through by diverting the blown-back solids to a collector while the feed was switched to filtered tap water. The solids were washed out completely and the tap water flux returned to the initial 800 liters/hour flux. Thus the backwashing system and design of apparatus of FIG. 4 is completely satisfactory for this exacting use.

Figure 6:
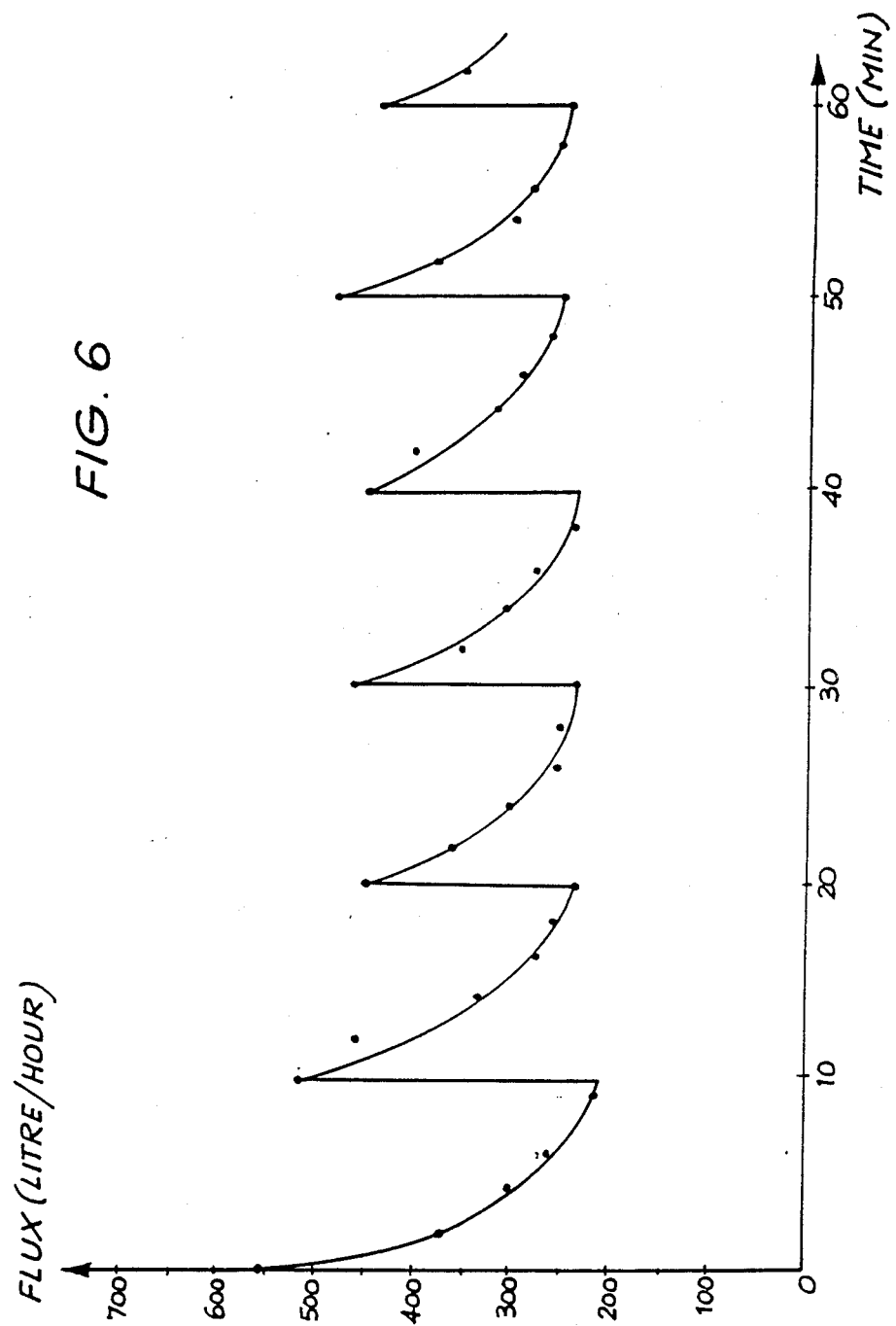

In contrast, FIG. 6 shows the lower equilibrium peak flux averaging 466 (versus the earlier 576) liters/hour under the same feed and temperature conditions but backwashing every ten minutes with one liter of permeate but no gas per square meter of cartridge. This larger permeate use further reduces the output by 6 liters/hour. Thus the combined pulsed permeate/gas pulse system of the invention is far superior to backwashing with permeate alone in known fashion. The lower removal of fouling by permeate backwashing alone is shown by the fact that the cartridge did not completely clean by using permeate alone when the feed was switched to filtered tap water. Even long operation gave only a partial recovery of the original water flux to 787 liters/hour from the initial 800 liters/hour. This contrasts with the complete recovery of permeation rate given above when the washing of the fouled fibres was done in accordance with the invention.

We claim:

1. A method of concentrating solids in a liquid suspension using a microfilter, said liquid suspension containing either a high solids content or solids which substantially form a gel-limiting layer on a filter surface or in pores of said filter, said microfilter comprising a plurality of hollow microporous, elastic fibres within a shell or housing, each fibre having an outer surface, an inner surface defining a lumen, and a porous wall therebetween, said method comprising the steps of:
   (i) applying the liquid suspension to the outer surface of the elastic microporous, hollow fibres; whereby:
      (a) a portion of the liquid suspension passes through the walls of the fibres, thereby being drawn off as clarified liquid from the fibre lumens,
      (b) at least a portion of the solids of said suspension is retained on or in the fibres or otherwise within the shell while the remaining solids not being retained are removed from the shell with the remaining portion of the liquid suspension;
   (ii) discharging the retained solids from the shell by:
      (a) applying to the fibre lumens a gas at a pressure sufficient to stretch substantially all of the pores, followed by:
      (b) maintaining the flow of the gas at said pressure through the lumens for a time sufficient to drive the liquid from the pores having a bubble point below the pressure of the gas so as to wash out any solids retained in those pores and to substantially dislodge solids retained on the outer surface of the fibres whereby the washed and dislodged solids are removed from the shell to an external collection point, and then
      (c) reducing the pressure of the gas so that the pores will substantially return to their original size whereupon the gas is removed so that a portion of the liquid suspension passes through the walls of the fibres to be drawn off as a clarifying liquid from the fibre lumens.

2. The method according to claim 1 wherein the application of the pressurised gas includes the steps of:
   (a) initially applying the gas at a pressure below the bubble point of the walls of the fibres so as to substantially displace liquid from the fibre lumens,
   (b) sealing the shell and the external surfaces of the fibres with a liquid,
   (c) increasing the pressure of the gas above the bubble point of the walls of the fibres, and,
   (d) releasing the liquid seal to allow the trapped gas to escape substantially uniformly through the fibre walls.

3. The method according to claim 2, wherein the liquid providing the sealing of the shell is the feed liquid.

4. The method according to claim 1 wherein the steps of the method are carried out as a continuous process utilising repetitive cycles of solids retention and solids discharge.

5. The method according to claim 4, wherein the resumption of flow of feed suspension through the fibres after the solids discharging steps is delayed for sufficient time to allow the expanded pores to substantially recover to their original size so that over-size particles from the feed suspension will be substantially incapable of passing into or through the enlarged pores.

6. The method according to claim 5, wherein the resumption of the flow of feed suspension is delayed by applying the gas at a pressure higher than that of the feed suspension and allowing the pressure of the gas to fall below the feed pressure at a rate which will allow the pores of the fibres to substantially recover to their original size before the flow of feed is resumed.

7. The method according to claim 4, wherein the solids discharge step is followed by a wetting agent addition step.

8. The method according to claim 4, wherein the solids discharge step is followed by the resumption of feed at sufficient pressure to shrink the gas bubbles retained in the pores of the fibres so as to aid the passage of the bubbles from the pores and to maintain sufficient solubility of the gas in the feed and/or clarified liquid.

9. The method according to claim 1, wherein the flow of treated feed suspension from the shell is controlled by valve means so as to apply a back pressure to the feed.

10. The method according to claim 1, wherein in step (ii) (b) the flow of gas in the lumens is maintained so as to at least maintain the stretch of the larger pores.

11. The method according to claim 1, wherein in step (ii) (a) said gas is applied to the fibre lumens in a manner such that said gas is introduced into the fibre lumens at a pressure sufficient to pressurize the liquid in substantially all of the pores to a pressure sufficiently above the bubble point pressure of the pores.

* * * * *